US008306676B1

(12) United States Patent
Ingvalson et al.

(10) Patent No.: US 8,306,676 B1
(45) Date of Patent: Nov. 6, 2012

(54) SYSTEMS AND METHODS FOR DIFFERENTIAL ALTITUDE ESTIMATION UTILIZING SPATIAL INTERPOLATION OF PRESSURE SENSOR DATA

(75) Inventors: Ryan Ingvalson, Saint Michael, MN (US); Michael R. Elgersma, Plymouth, MN (US); Wayne A. Soehren, Wayzata, MN (US)

(73) Assignee: Honeywell International Inc., Morristown, NJ (US)

( * ) Notice: Subject to any disclaimer, the term of this patent is extended or adjusted under 35 U.S.C. 154(b) by 10 days.

(21) Appl. No.: 13/087,546

(22) Filed: Apr. 15, 2011

(51) Int. Cl.
G05D 1/00 (2006.01)

(52) U.S. Cl. ............. 701/4; 701/207; 701/214; 34/462; 340/970; 340/977; 244/180

(58) Field of Classification Search ............. 701/4, 211, 701/214, 9, 216, 209; 342/357.15; 702/50
See application file for complete search history.

(56) References Cited

U.S. PATENT DOCUMENTS

| | | | |
|---|---|---|---|
| 6,518,918 B1 * | 2/2003 | Vannucci et al. | 342/357.31 |
| 7,237,437 B1 | 7/2007 | Fedora | |
| 7,397,357 B2 | 7/2008 | Krumm et al. | |
| 7,428,466 B2 | 9/2008 | Makela et al. | |
| 7,429,948 B2 | 9/2008 | Burgett et al. | |
| 7,489,397 B2 | 2/2009 | Acevedo et al. | |
| 7,698,950 B2 | 4/2010 | Kraatz | |

FOREIGN PATENT DOCUMENTS

| | | |
|---|---|---|
| EP | 1154231 | 11/2001 |
| EP | 1166142 | 1/2002 |
| EP | 2182321 | 5/2010 |
| JP | 2008241467 | 10/2008 |

OTHER PUBLICATIONS

Fang et al., "Design of a Wireless Assisted Pedestrian Dead Reckoning System—The NavMote Experience", "IEEE Transactions on Instrumentation and Measurement", Dec. 2005, pp. 2342-2358, vol. 54, No. 6, Publisher: IEEE.

Parviainen et al, "Differential Barometry in Personal Navigation", "Position, Location and Navigation Symposium", 2008, pp. 148-152, Publisher: IEEE, Published in: Monterey, CA.

Retscher, Gunther, "Augmentation of Indoor Positioning Systems with a Barometric Pressure Sensor for Direct Altitude Determination in a Mult", "Cartography and Geographic Information Science", Oct. 1, 2007, Published in: Available at http://findarticles.com/p/articles/mi_hb3006/is_4_34/ai_n29388385/ accessed Mar. 18, 2011.

(Continued)

*Primary Examiner* — Behrang Badii
*Assistant Examiner* — Basil T Jos
(74) *Attorney, Agent, or Firm* — Fogg & Powers LLC

(57) ABSTRACT

Systems and methods for differential altitude estimation utilizing spatial interpolation of pressure sensor data are provided. In one embodiment, a method for mobile navigation comprises: measuring a horizontal location of a mobile navigation unit to generate two-dimensional horizontal coordinate data; measuring a barometric pressure at the mobile navigation unit with a sensor to obtain local pressure data; processing information representative of pressure data derived from a network of a plurality reference stations to obtain a correction factor; performing a calculation using the two-dimensional horizontal coordinate data, the local pressure data, and the correction factor to calculate an altitude coordinate; and determining an altitude of the mobile navigation unit from the altitude coordinate.

18 Claims, 3 Drawing Sheets

OTHER PUBLICATIONS

Wang et al., "Fusion of Barometric Sensors, WLAN Signals and Building Information for 3-D Indoor/Campus Localization", "Proceedings of International Conference on Multisensor Fusion and Integration for Intelligent Systems", 2006.

Weller et al., "Ocean Reference Stations", "CICOR available at http://www.whoi.edu/cicor/page.do?pid=19476&tid=282&cid=39815 accessed Mar. 18, 2011", 2007, Publisher: Woods Hole Oceanographic Institution.

Wubbena et al., "Network-Based Techniques for RTK Applications", "GPS Symposium", Nov. 14-16, 2001, Publisher: GPS Society, Japan Institute of Navigation, Published in: Tokyo, Japan.

* cited by examiner

SYSTEMS AND METHODS FOR DIFFERENTIAL ALTITUDE ESTIMATION UTILIZING SPATIAL INTERPOLATION OF PRESSURE SENSOR DATA

GOVERNMENT RIGHTS

This invention was made with Government support under HR011-09-C-0079 awarded by DARPA. The Government may have certain rights in the invention.

BACKGROUND

In many navigation applications, estimation of altitude is of essential importance, and with many new applications, especially the area of personal navigation, there is an even increased emphasis on altitude accuracy. One of the primary altitude sensors used in the estimation of altitude is the barometer. Fundamentally, a barometer does not measure altitude directly; instead, it measures atmospheric pressure which can then be converted to altitude based upon an empirical altitude vs. pressure model. The problem with this is that atmospheric pressure is not constant at a given altitude. At a given altitude, the pressure may vary greatly with time and horizontal displacement due to weather fronts passing through the area. Due to these variations, the conversion from pressure to altitude can be inaccurate. This system and method is designed to correct for the altitude errors caused by the weather front-induced pressure variations.

For the reasons stated above and for other reasons stated below which will become apparent to those skilled in the art upon reading and understanding the specification, there is a need in the art for improved systems and methods for differential altitude estimation utilizing spatial interpolation of pressure sensor data.

SUMMARY

The Embodiments of the present invention provide methods and systems for differential altitude estimation utilizing spatial interpolation of pressure sensor data and will be understood by reading and studying the following specification.

Systems and methods for differential altitude estimation utilizing spatial interpolation of pressure sensor data are provided. In one embodiment, a method for mobile navigation comprises: measuring a horizontal location of a mobile navigation unit to generate two-dimensional horizontal coordinate data; measuring a barometric pressure at the mobile navigation unit with a sensor to obtain local pressure data; processing information representative of pressure data derived from a network of a plurality reference stations to obtain a correction factor; performing a calculation using the two-dimensional horizontal coordinate data, the local pressure data, and the correction factor to calculate an altitude coordinate; and determining an altitude of the mobile navigation unit from the altitude coordinate.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention address the problems of barometric altitude estimation by means of a network of barometric reference stations located at known positions. When a user with a mobile navigation device has access to information representative of the measurements provided by these reference stations, embodiments of the present invention provides methods that allow the mobile navigation device to incorporate weather front induced pressure variations into a barometric altitude estimation. That is, the information from the barometric reference stations is used to apply a correction factor to the mobile navigation device's barometer output data, providing for improved accuracy in calculating altitude coordinates. The correction factor may be provided, for example, by a spatial interpolation of the barometric pressure measurements of the reference station barometers within the network, and is applied to barometer output data and horizontal coordinate data generated by the mobile navigation device.

As mentioned above, embodiments of the present invention address inaccuracies in barometer based altitude estimates by utilizing a network of reference stations that measure atmospheric pressure at known horizontal coordinates and altitudes. For example, time-varying pressure measurements taken via the network of fixed outdoor reference stations are interpolated to determine a vector of coefficients that describe weather-front related pressure changes. A mobile navigation device equipped with a barometer will utilize the coefficients to correct for errors in its own pressure measurements for the purpose of determining an accurate measurement of its own altitude.

Figure 1:
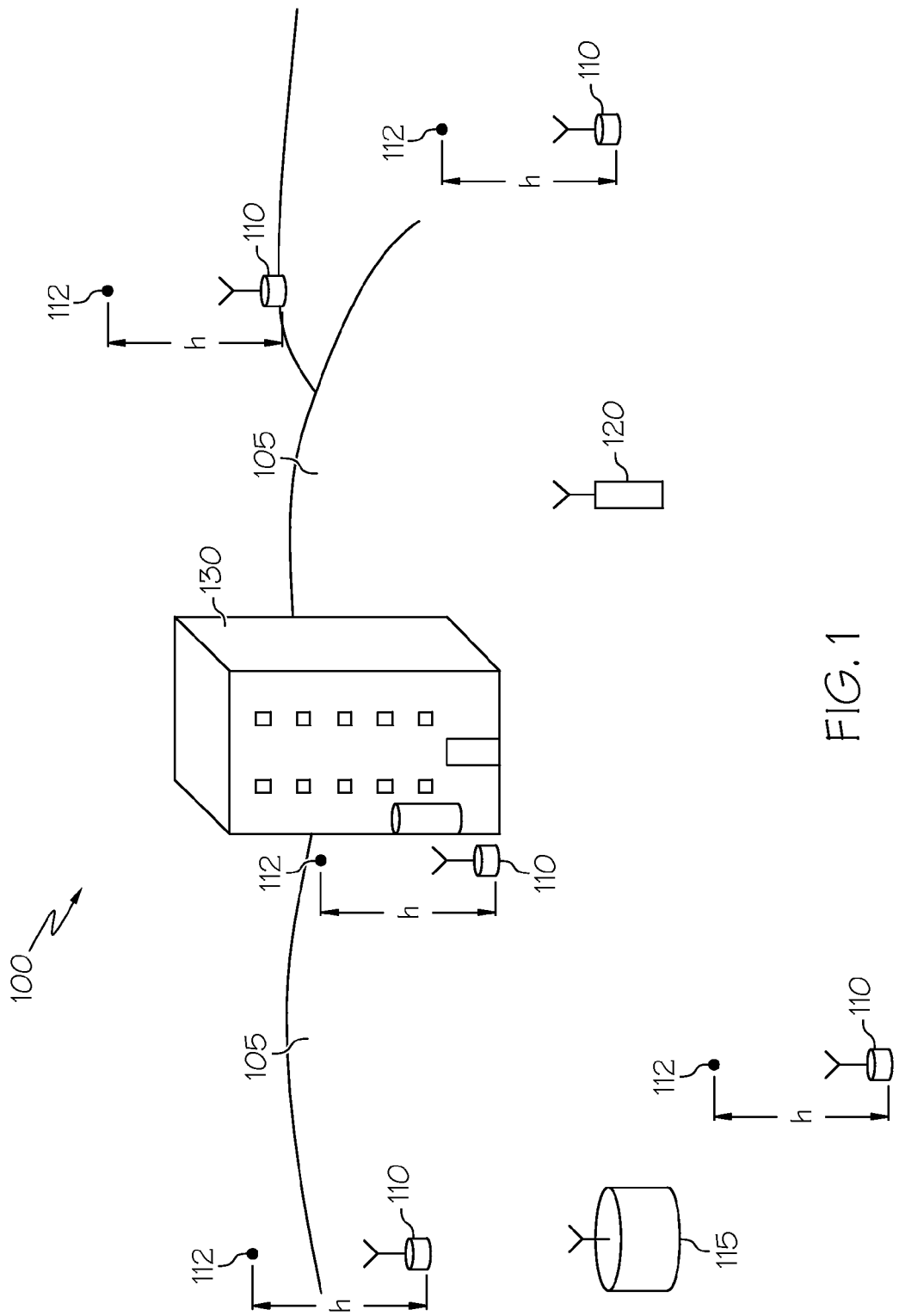
FIG. 1 is a block diagram illustrating a system of one embodiment of the present invention.

FIG. 1 is diagram illustrating a navigation system 100 using barometric spatial interpolation of one embodiment of the present invention. System 100 comprising a plurality of N reference stations (shown generally at 110) spaced across a geographic region 105. As would be appreciated by one of ordinary skill in the art upon reading this specification, barometric pressure does not change much over small areas of a horizontal plane. The reference stations should be sufficiently spaced apart so that their collective measurements represent more than just cumulative point data. Accordingly, in one embodiment, reference stations are spaced at least 1 kilometer apart and geographic region 105 represents a city wide area. Mobile navigation unit 120 travels through-out geographic region 105

The purpose of collecting barometric pressure data from the reference stations 110 is to provide correction data to mobile navigation unit 120 that permits mobile navigation unit 120 to accurately determine its own altitude based on its own barometric sensor measurements. With embodiments of the present invention, that correction data is in the form of a vector of coefficients that describe the weather-front related pressure changes. These coefficients may be estimated based on a linear regression of the outdoor pressure measurements at the reference stations, and they define a linear function that provides an estimated model of the pressure variation within the region in and around the network of reference stations. Mobile navigation unit 120 may use an estimate of its location to interpolate into this function to provide a correction to its own barometric pressure data.

For example, for any one of the N reference stations 110, let $$x(i) = \begin{bmatrix} x_1(i) \\ x_2(i) \\ x_3(i) \end{bmatrix} \in R^3 \quad (Eq.\ 1)$$

where i=1,2, ... N and N is the number of reference stations 110 in $R^3$. The variables $x_1(i)$ and $x_2(i)$ represent the horizontal components of the location coordinates for reference station "i" and $x_3(i)$ is a vertical component (i.e. an altitude coordinate) normal to the $x_1(i)$ and $x_2(i)$ coordinates. In alternate embodiments, the three dimensional coordinate system chosen for x(i) may be arbitrarily selected. Over a given spatial region (for example, a 10 km by 10 km horizontal region with 1 km vertical extent) a barometric pressure, p(x), can be quite accurately approximated as a linear function of position, $x \in R^3$ (even as weather fronts are passing through region 105) using the equation:

$$p(x) = b^T \begin{bmatrix} x \\ h_1 \end{bmatrix} = \begin{bmatrix} x \\ h_1 \end{bmatrix}^T b \quad (Eq.\ 2)$$

where coefficients $b=[b_1 \ldots b_4]^T \in R^4$ and $h_1$ is a scalar constant representing a calibration bias offset. That is, $h_1$ is a conditioning parameter for the purpose of making the matrix mathematics more stable. A value of $h_1$ on the order of the average separation between reference stations 110 will achieve the desired stability. For this example, let $h_1$=500 meters. Equation Eq. 2 represents a linear equation derived from reference station 110 data that describes how pressure in region 105 varies with position. That is, if we have a known location for a user in three dimensions, Equations Eq. 2 will tell us what the pressure should be at that location.

To determine the four coefficients $[b_1\ b_4]^T=b$, pressure p(x) is measured at a plurality of "N" locations in space. For at least one embodiment, N≥4. However, embodiments comprising measurements from two or more locations are possible and contemplated as within the scope of embodiments of the present invention. Combining equations (Eq. 1) and (Eq. 2) provides that $$p(x(i)) = \begin{bmatrix} x(i) \\ h_1 \end{bmatrix}^T b$$

for i=1,2, ... N, which gives the matrix equation:

$$P = Mb \quad (Eq.\ 3)$$

$$\text{where } P = \begin{bmatrix} p(x(1)) \\ p(x(2)) \\ \vdots \\ p(x(N)) \end{bmatrix} \text{ and }$$

$$M = \begin{bmatrix} x(1) & x(2) & \ldots & x(N) \\ h_1 & h_1 & \ldots & h_1 \end{bmatrix}^T$$

Thus, each of the values p(x(1)) ... p(x(N)) of matrix P represent a barometric pressure reading obtained one of the reference stations 110 at one point in time, and M represents the locations of each of the reference stations 110.

In one embodiment, three of the N reference pressure measurements would be made from stations 110 located on the ground near the horizontal boundaries of the region 105, while the remaining measurements would be made at higher altitudes. However, embodiments of systems where measurements are obtained just from measurements made at ground level are also possible. In one such embodiment, measurements made at ground level are augmented by pseudo projected measurements generated for one hypothetical point above each of the N measured points (as explained in greater detail below).

Over small vertical displacements (for example 1 km), p(x) varies linearly with altitude according to a coefficient, $c_{T(i)}$, that itself depends on the temperature, T(x(i)) at each reference station 110. When that temperature T(x(i)) is known at each reference station 110, and pressure, p(x(i)), as measured at each reference station 110 is known, it is possible to then calculate a pressure at some altitude, $h_2$, (for example, $h_2$=500 meters) above each of the reference stations 110 using the relationship $$p(x(i)+x_h)=p(x(i))+c_{T(i)}\cdot h_2 \quad (Eq.\ 4)$$

where $$x_h = \begin{bmatrix} 0 \\ 0 \\ h_2 \end{bmatrix}$$

and where the coefficient, $c_{T(i)}$, gives the rate of change of pressure with respect to altitude. In general, $c_T$ is a function of pressure and temperature:

$$c_T(p, T) = \frac{dp}{dh} = (-0.0342\ \text{K/meter})\frac{p}{T} \quad (Eq.\ 5)$$

where temperature T is in Kelvin, and as a simplification of notation we define $c_{T(i)}=c_T(p(x(i)),T(x(i)))$. That is, for each measured pressure p(x(i)), a projected measurement is generated for a hypothetical point located above the actual measured point. This is shown in FIG. 1 as hypothetical point 112 above each reference station 110. Augmenting the P and M matrixes of Equation Eq. 3 above to include the N measured points and the N projected measurements, we get:

$$P = \begin{bmatrix} p(x(1)) \\ \vdots \\ p(x(N)) \\ p(x(1)) + c_{T(1)} \cdot h_2 \\ \vdots \\ p(x(N)) + c_{T(N)} \cdot h_2 \end{bmatrix} \text{ and}$$

$$M = \begin{bmatrix} x(1) & \ldots & x(N) & x(1) + x_h & \ldots & x(N) + x_h \\ h_1 & \ldots & h_1 & h_1 & \ldots & h_1 \end{bmatrix}^T \in R^{2N \times 4}$$

Solving for the coefficient vector $b \in R^4$ is then accomplished using one of several techniques. For example, a least-squares solution for coefficient vector b is:

$$b = (\epsilon^2 I_4 + M^T M)^{-1} M^T P \quad \text{(Eq. 6)}$$

where $M^T M$ is size 4×4 and $\epsilon$ is selected such that $\epsilon \ll \|M\|$. In other words, the vector b is a result of a linear regression of pressure data from reference stations 110. As would be appreciated by one of ordinary skill in the art, the size of $M^T M$ will depend on the number of reference stations 110 in the network. Each time that the pressure or temperature at any of the monitoring reference stations 110 change, the values of p(x(1)) through p(x(N)) change and the calibration is redone, providing a time varying set of coefficients b(t). Mobile navigation unit 120 utilizes coefficients b(t) to obtain accurate altitude measurements for both indoor and outdoor environments as described next.

The coefficient vector b is approximately equal to:

$$b = \frac{1}{n} \sum_{i=1}^{n} \left[ \frac{dp}{dx_1(i)} \frac{dp}{dx_2(i)} \frac{dp}{dx_3(i)} (p(x(i)) - \nabla \cdot x(i)) \frac{1}{h_1} \right]^T. \quad \text{(Eq. 7)}$$

Where the pressure gradient $\nabla_i$ is defined as:

$$\nabla_i = \left[ \frac{dp}{dx_1(i)} \frac{dp}{dx_2(i)} \frac{dp}{dx_3(i)} \right]$$

When N=1, then the horizontal components of the pressure gradient cannot be observed. This results in the following:

$$\nabla_1 = \begin{bmatrix} 0 & 0 & \frac{dp}{dx_3(1)} \end{bmatrix} = \begin{bmatrix} 0 & 0 & c_{T(1)} \end{bmatrix},$$

In this case, the coefficient vector b is simply given by $$b = \begin{bmatrix} 0 & 0 & c_{T(1)} & (p(x(1)) - c_{T(1)} \cdot x_3(1)) \frac{1}{h_1} \end{bmatrix}$$

For determining the altitude of mobile navigation unit 120 in outdoor environments, let $$y(t) = \begin{bmatrix} y_1(t) \\ y_2(t) \\ y_3(t) \end{bmatrix}$$

be the time varying location of mobile navigation unit 120 while p(y(t)) is the barometric pressure measured by mobile navigation unit 120. The three dimensional coordinate system selected for y(t) is the same as for x(i). For the system described above, $y_1(t)$ and $y_2(t)$ are horizontal coordinates of mobile navigation unit 120 while $y_3(t)$ represents an altitude coordinate in a direction normal to the plane define by $y_1(t)$ and $y_2(t)$. It should be understood that the term "altitude coordinate" as used through-out this specification refers to a vertical distance from the plane defined by the two-dimensional horizontal coordinate data. After solving for the calibration coefficients, $[b_1(t) \; b_2(t) \; b_3(t) \; b_4(t)]^T = b(t)$, altitude, $y_3(t)$, of mobile navigation unit 120 is calculated from the local pressure, p(y(t)), measured at the mobile navigation unit 120 at horizontal location $$\begin{bmatrix} y_1(t) \\ y_2(t) \end{bmatrix}$$

using the relationship:

$$p(y(t)) = [b_1(t) \; b_2(t) \; b_3(t) \; b_4(t)] \begin{bmatrix} y_1(t) \\ y_2(t) \\ y_3(t) \\ h_1 \end{bmatrix} = \quad \text{(Eq. 8)}$$

$$b_3(t) y_3(t) + [b_1(t) \; b_2(t) \; b_4(t)] \begin{bmatrix} y_1(t) \\ y_2(t) \\ h_1 \end{bmatrix}$$

So as long as mobile navigation unit 120 is located where the linear interpolation between reference points is valid (such as outdoors, or in a structure open to the atmosphere, for example), the altitude of mobile navigation unit 120 is computed as:

$$y_3(t) = \frac{1}{b_3(t)} \left( p(y(t)) - [b_1(t) \; b_2(t) \; b_3(t) \; b_4(t)] \begin{bmatrix} y_1(t) \\ y_2(t) \\ h_1 \end{bmatrix} \right) \quad \text{(Eq. 9)}$$

Since most buildings employ climate controls, determining the altitude of mobile navigation unit 120 in indoor environments requires incorporation of information regarding temperature. As with the outdoor case, let $$y(t) = \begin{bmatrix} y_1(t) \\ y_2(t) \\ y_3(t) \end{bmatrix}$$

be the time varying location of mobile navigation unit 120 while p(y(t)) is the barometric pressure measured by mobile navigation unit 120. When the mobile navigation unit 120 enters building 130, the indoor temperature can change with respect to outdoor temperature, changing the relationship of pressure-versus-altitude. Therefore, in one embodiment temperature at module unit 120 is measured. In another embodiment, the temperature at module unit 120 is assumed to be a constant (such as around 72 degrees Fahrenheit, for example). In one embodiment, inside the building, altitude is computed with respect to the fixed altitude, $y_3(t_0)$, determined by mobile navigation unit 120 at the entrance to the building 130 using:

$$y_3(t) = y_3(t_0) + \frac{p(y(t)) - p_0(t) - \Delta p_{in\_out}}{c_{Tin}(t)} \quad \text{(Eq. 10)}$$

where $t_0$ is the time just before mobile navigation unit 120 enters the building 130, and $y(t_0)$ is the calculated position vector for mobile navigation unit 120 at time $t_0$. The term $\Delta p_{in\_out}$ is the pressure difference (e.g. induced by the climate control system) between the indoor and outdoor pressure at the point the mobile navigation unit 120 entered the building. For any time t, pressure at the building entrance, $p_0(t)$ is estimated from $p_0(t) = [b(t)]^T y(t_0)$. Alternatively, a general expression is $p_0(t) = p(y(t_0))$. With $T_{in}$ the measured or estimated indoor air temperature, then $$c_{Tin}(t) = c_T(p_0(t), T_{in}(t)). \quad \text{(Eq. 11)}$$

That is, the value $y_3(t_0)$ measured at the entrance of the building is treated as a baseline and $y_3(t)$ is subsequently determined based on changes from that baseline estimated from pressure and temperature data taken by remote unit 120 at time, t.

As would be appreciated by one of ordinary skill in the art upon reading this specification, at least some degree of the accuracy in the altitude solution using the systems and methods described above is dependent on the quality of the sensor calibration at reference stations 110 and mobile navigation unit 120. The better these sensors are calibrated, the more accurate the barometric pressure measurements they provide.

One way to reduce reliance on reference stations 110 and mobile navigation unit 120 to provide accurate absolute barometric pressure measurements is to apply a double-difference approach. Using a double-difference approach the stream of barometric pressure measurements obtained at both the reference stations 110's sensors and the mobile navigation unit 120's sensor are single-differenced with a measurement from their own data stream at some fixed common time in the past referred to herein as time $t_s$. In other words, instead of performing calculations using measurements of absolute pressure, calculations are preformed based on differences in measured pressure, referred to herein as single-differenced measurements. The single-differenced measurements of the reference stations are then spatially interpolated to the user's position. Since we have assumed that the vertical pressure gradient is constant at a given horizontal position, the single-difference pressure variation is not dependent upon the altitude. As a result, the single-differenced pressure measurement from reference station i is defined as:

$$\Delta p(x(i), t, t_s) = p(x(i), t) - p(x(i), t_s) = \begin{bmatrix} x_1(i) \\ x_2(i) \\ h_1 \end{bmatrix}^T b'$$

Accordingly, the calibration coefficients, now denoted as b', are defined as $b'(t,t_s) = [b_1'(t,t_s) \; b_2'(t,t_s) \; b_3'(t,t_s)]^T$ and are determined based on single-differenced measurements of the pressures measured at reference stations 110 rather than absolute pressure measurement data. As with the vector b, the vector b' is also result of a linear regression of pressure data from reference stations 110. Using this approach, the need to augment actual pressure measurements at known points with pseudo projected measurements is eliminated. This is also due to the fact that we have assumed the vertical pressure gradients are constant at a given horizontal position.

The interpolated reference station single-difference is then differenced with the current single-differenced data of mobile navigation unit 120's barometer output stream. The current single-differenced data of mobile navigation unit 120's barometer output is given by $\Delta p(y(t),t,t_s) = p(y(t)) - p(y(t_s))$. This results in a double-difference relative pressure measurement, which is used to estimate the change in altitude that the mobile navigation unit 120's position incurred during the time interval from $t_s$ to t, and this altitude change estimate can be used to correct the mobile navigation unit 120's barometric output. Note, in subsequent references to $\Delta p$ and b', the arguments t and $t_s$ will be implied and will not be included unless it is not explicitly clear what these arguments should be. The double-difference approach is advantageous since it effectively reduces the number of unknown sensor biases from N+1 (being the N reference station 110's barometric sensors plus the mobile navigation unit 120's sensor) to 1.

Using the equations from above, a linear matrix equation with unknown b' can be formed:

$$\Delta P = Mb' \quad \text{(Eq. 11)}$$

$$\text{where } \Delta P = \begin{bmatrix} \Delta p(x(1)) \\ \Delta p(x(2)) \\ \vdots \\ \Delta p(x(N)) \end{bmatrix} \text{ and } M = \begin{bmatrix} x_1(1) & x_1(2) & & x_1(N) \\ x_2(1) & x_2(2) & \ldots & x_2(N) \\ h_1 & h_1 & \ldots & h_1 \end{bmatrix}^T, \text{ and}$$

where each of the values $\Delta p(x(1)) \ldots \Delta p(x(N))$ of the matrix $\Delta P$ represent a single-differenced barometric pressure reading obtained one of the reference stations 110 at one point in time. Note, the implied time arguments t and $t_s$ are the same for all entries of $\Delta P$.

Solving for the coefficient vector $b \in R^3$ for this case is also possible using one of several techniques. A least-squares solution for coefficient vector b is:

$$b' = (\epsilon^2 I_3 + M^T M)^{-1} M^T \Delta P \quad \text{(Eq. 12)}$$

where $M^T M$ is size 3×3 and $\epsilon$ is selected such that $\epsilon << \|M\|$. As would be appreciated by one of ordinary skill in the art, the size of $M^T M$ will depend on the number of reference stations 110 in the network. As before, the $\epsilon$ term ensures invertability of the matrix above and that the coefficients of b are not unreasonably large, even when N<3. Each time that the pressure or temperature at any of the monitoring reference stations 110 change, the values of $\Delta p(x(1))$ through $\Delta p(x(N))$ change and the calibration is redone, providing a time varying set of coefficients b'.

For determining the altitude of mobile navigation unit 120 double-difference based coefficients in an outdoor environments, let $$y(t) = \begin{bmatrix} y_1(t) \\ y_2(t) \\ y_3(t) \end{bmatrix}$$

be the time varying location of mobile navigation unit 120 while $\Delta p(y(t))$ is the single-difference barometric pressure change measured by mobile navigation unit 120 which can be computed as $$\Delta p(Y,t,t_s) = p(y(t)) - p(y(t_s)).$$

Understanding that this pressure difference is due to both changes in altitude experience by the mobile navigation unit 120 during the time interval from $t_s$ to t and the weather-induced pressure variations experience by the mobile navigation unit during the time interval from $t_s$ to t, this relationship can be generally approximated as:

$$\Delta p(y,t,t_s) = \overline{c}_T(t,t_s) \cdot \Delta y_3(t,t_s) + \Delta p_w(y(t),t,t_s) \quad \text{(Eq. 13)}$$

Where $\Delta y_3(t,t_s) = y_3(t) - y_3(t_s)$, $\overline{c}_T(t,t_s)$ is the "average" pressure rate of change versus altitude at the mobile unit 120, and $\Delta p_w(y(t),t,t_s)$ is the weather-induced pressure change, which will be estimated via the single-differenced reference station data. Finally, the altitude coordinate $y_3(t)$ at time t can be estimated as:

$$y_3(t) = y_3(t_s) + \frac{1}{\overline{c}_T(t,t_s)}[\Delta p(y,t,t_s) - \Delta p_w(y(t),t,t_s)] \quad \text{(Eq. 14)}$$

Since $\Delta p(y,t,t_s)$ is a quantity computed over a time interval the resulting values $\overline{c}_T(t,t_s)$ and $\Delta p_w(y(t),t,t_s)$ are integrated quantities. The exact functions are given below, but in many cases computation of these integrals can be approximated and/or simplified:

$$\overline{c}_T(t,t_s) = \frac{1}{t-t_s}\int_{t_s}^{t} c_T(p(y(\tau)), T(y(\tau)))d\tau \quad \text{(Eq. 15)}$$

and $$\Delta p_w(x(t), t, t_s) = \int_{t_s}^{t} \frac{dp_w}{dt}(x(\tau))d\tau, \quad \text{(Eq. 16)}$$

where $$\frac{dp_w}{dt}(x(t))$$

is the rate of weather-induce pressure change at location x(t). The integral of Eq. 16 can be approximated as:

$$\Delta p_w(x(t), t, t_s) = \Delta p_{interp}(x(t), t, t_s) = [b'(t, t_s)]^T \cdot \begin{bmatrix} x_1(t) \\ x_2(t) \\ h_1 \end{bmatrix}, \quad \text{(Eq. 17)}$$

The integral of $\overline{c}_T(t,t_s)$ is just an averaging integral, and it can be computed via any number of means. Since the integrand of Eq. 16 is difficult to measure directly, Eq. 16 can be computed using Eq. 17 for trajectories where x(t) does not change in the interval from time $t_s$ to t. When the mobile navigation unit 120 does not move much in the time interval between time $t_s$ and t, then Eq. 17, although not exact, is still a very good approximation of Eq. 16. Next are presented two-methods for applying Eq. 17 to general trajectories in an accurate, but not exact, manner. These are two of perhaps many methods that one embodiment of this invention may implement.

The first approach is simply an "end-point averaging" method. This method applies when the trajectory y(t) of mobile navigation unit 120 has nearly constant velocity. The "end-point averaging" method is given by:

$$\Delta p_w(y(t), t, t_s) \approx \frac{1}{2}[b'(t, t_s)]^T \cdot \left(\begin{bmatrix} y_1(t) \\ y_2(t) \\ h_1 \end{bmatrix} + \begin{bmatrix} y_1(t_s) \\ y_2(t_s) \\ h_1 \end{bmatrix}\right)$$

As the name implies and as the equation indicates, this is an average of the weather-induced pressure change at the start (at time $t_s$) and stop (at time t) locations of mobile navigation unit 120. It does not consider the trajectory of y(t) during the interval. Additionally, this method implicitly assumes (in addition to the near constant velocity assumption) that the weather-induced pressure variations vary linearly, or nearly linearly, with time, otherwise b'(t,$t_s$) is not valid at both $t_s$ and t. At the expense of more computation, effects of both of these assumptions can be alleviated. Thus, in one embodiment, an even more general method may be implemented. In this method, the full time interval from $t_s$ to t is broken into k sub-intervals, such that the assumptions of the "end-point averaging" method apply within each of the sub-intervals. Let the k sub-intervals be defined as $\Delta t_i = t_i - t_{i-1}$, where i∈[1 2 ... k], $t_i > t_{i-1}$ for all i, and $t_0 = t_s$. In this method, the weather-induced pressure change experienced at mobile navigation unit 120 during the time interval from $t_s$ to t is given by:

$$\Delta p_w(y(t), t, t_s) \approx \sum_{i=1}^{k}\left([b'(t_i, t_{i-1})]^T \cdot \begin{bmatrix} \overline{y}_1(t_i, t_{i-1}) \\ \overline{y}_2(t_i, t_{i-1}) \\ h_1 \end{bmatrix}\right),$$

where $\overline{y}_1(t_i, t_{i-1})$ represents the average of the position component $y_1(t)$ in the interval from $t_i$ to $t_{i-1}$, and similarly for $\overline{y}_2(t_i, t_{i-1})$.

For determining the altitude of mobile navigation unit 120 in indoor environments, again let $$y(t) = \begin{bmatrix} y_1(t) \\ y_2(t) \\ y_3(t) \end{bmatrix}$$

be the time varying location of mobile navigation unit 120 while $\Delta p(y(t))$ is the single-difference barometric pressure change measured by mobile navigation unit 120. Inside building 130, indoor temperature can change with respect to outdoor temperature, changing the relationship of pressure-versus-altitude. To obtain a temperature reference, temperature within the building 130 can either be measured by module unit 120, or alternately assumed to be a constant. In one embodiment, inside the building 130, altitude is computed with respect to the altitude coordinate $y_3(t_0)$ which represent the altitude at the entrance of building 130 at the time $t_0$ that mobile navigation unit 120 entered the building. This value becomes fixed and constant at time $t_0$ and for all time after. Based upon Eq. 14, it is computed as:

$$y_3(t_0) = y_3(t_s) + \frac{1}{\overline{c}_T(t_0, t_s)}[\Delta p(y, t_0, t_s) - \Delta p_w(y(t_0), t_0, t_s)] \quad \text{(Eq. 18)}$$

Once in building 130, the total altitude of mobile unit 120 is computed primarily based on the difference in pressure variation experienced by mobile unit 120 from the time of building entrance $t_0$ to the current time t and the weather-induced pressure variation experienced during the same time interval at the outdoor location $y(t_0)$—the point the mobile navigation unit 120 entered the building. The altitude is computed as:

$$y_3(t) = \qquad\qquad\qquad\qquad\qquad\qquad\qquad (Eq.\ 19)$$
$$y_3(t_0) + \frac{1}{\bar{c}_T(t,t_0)}[\Delta p(y, t, t_0) - \Delta p_w(y(t_0), t, t_0) - \Delta p_{in\_out}]$$

In this equation, the $\Delta p(y,t,t_0)$ term is the pressure change experience by the mobile navigation unit 120 while inside the building, and $\Delta p_w(y(t_0), t,t_0)$ is the weather-induced pressure change outside the building entrance. The term $\Delta p_{in\_out}$ is the pressure difference (e.g. induced by the climate control system) between the indoor and outdoor pressure at the point the mobile navigation unit 120 entered the building. The pressure gradient quantity $\bar{c}_T(t,t_0)$ is computed based upon the indoor environment the user experiences in the interval from time $t_0$ to t.

It should be noted that all methods of altitude calculation described herein have an inherent unknown bias. Therefore, for each of the embodiments described herein have the option of being calibrated by an external means such as GPS, or other absolute reference system. As would be appreciated by one of ordinary skill in the art after reading this specification, unknown bias may enter via the quantity p (y(t)) of Eq. 9 (for outdoor applications) and/or Eq. 10 (for indoor applications), and also through parameter $y_3(t_s)$ of Eq. 10. The quantity $p(y(t))$ represents the raw barometer sensor output of mobile navigation unit 120, and in general is inherently biased. Additionally, $y_3(t_s)$ may or may not be biased, and it may or may not be correlated with the error in parameter $p(y(t))$.

In one embodiment in operation, reference units 110 each periodically measure and transmit data pertaining to the barometric pressure at their location. In one embodiment, they further transmit data pertaining to their own coordinates so that mobile navigation unit does not need to know each of their locations a priori. In one embodiment utilizing the double-difference approach, the data pertaining to the barometric pressure is in the form of single-difference pressure data. In other embodiments utilizing the double-difference approach, the mobile navigation unit 120 will compute the single differences from reference station data itself. This option is advantageous because all time-syncing can be done in one platform: the mobile unit 120. For embodiments not utilizing the double-difference approach, the data pertaining to the barometric pressure provides absolute pressure measurements. In some embodiments, absolute pressure measurements are accompanied by pseudo projected measurements generated for hypothetical points existing a predefined distance above the measured points. In yet other embodiments, the mobile unit 120 will calculate the hypothetical projected data points itself.

In one embodiment, the data pertaining to the barometric pressure transmitted by the references units 110 is received, either directly or indirectly, by remote unit 120. Remote unit 120 then calculates a linear regression resulting in either b or b' from that data, and proceeds with calculating an altitude coordinate, $y_3(t)$ using the methods described above, based on current pressure data (either with or without temperature data) measured and collected at remote unit 120's current location.

In another embodiment, absolute barometric pressure data transmitted by the references units 110 is received directly by a central node 115, which then calculates the coefficients b from that data. Central node 115 then transmits the coefficients b to remote unit 120. This approach simplifies the amount of calculation that must be performed by mobile navigation unit 120, thus requiring less processing. In one embodiment, the function just described for central node 115 is instead incorporated into one of the reference stations 110 rather than in a stand-alone node. Once mobile navigation unit 120 receives the coefficients b, it proceeds with calculating altitude coordinate, $y_3(t)$, using the methods described above, based on current pressure data (either with or without temperature compensation) at the mobile navigation unit's current location.

Figure 2:
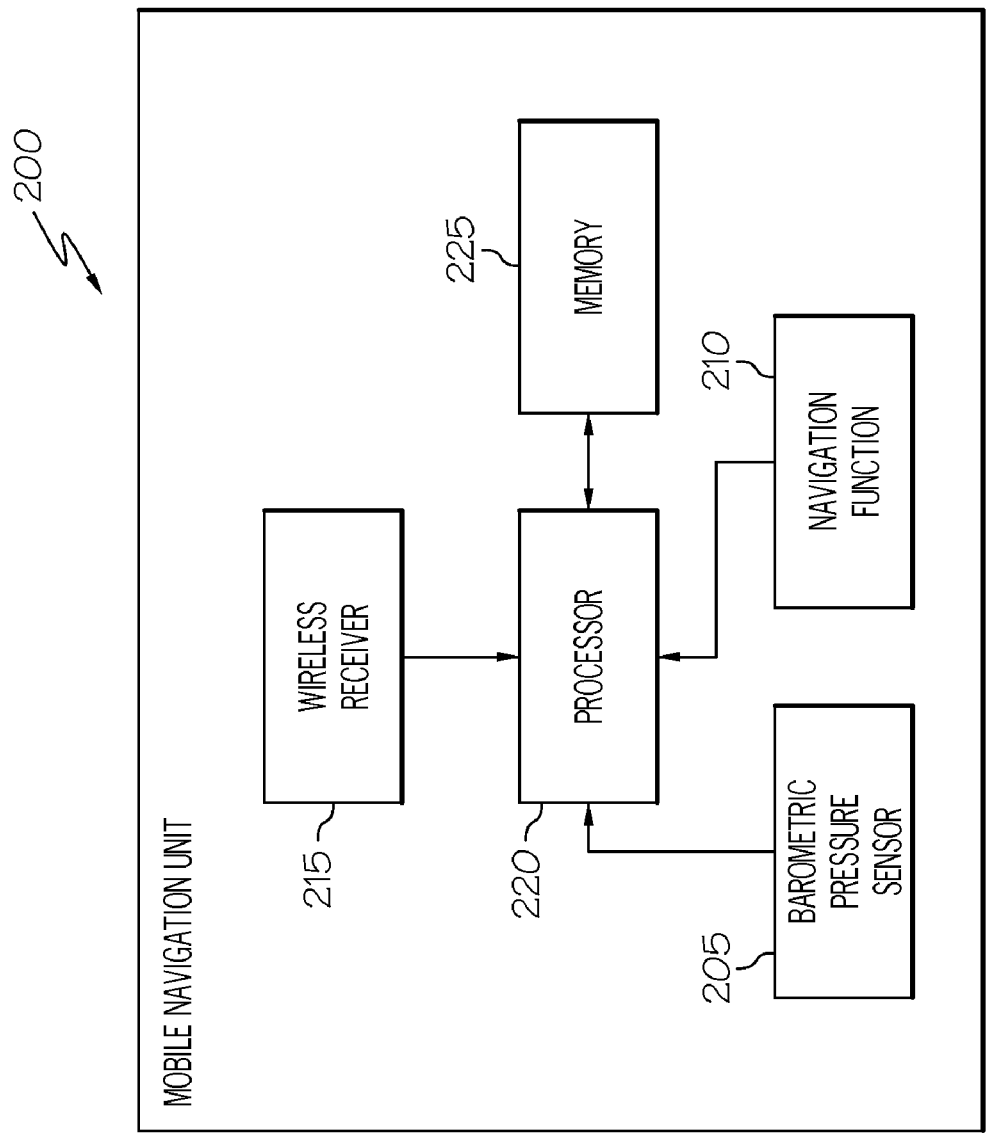
FIG. 2 is a block diagram illustrating a device of one embodiment of the present invention.

FIG. 2 is a block diagram illustrating a mobile navigation unit 200 of one embodiment of the present invention for realizing mobile navigation unit 120 as described in FIG. 1. Each of the optional embodiments thus described above for mobile navigation unit 120 apply to mobile navigation unit 200 and vice-versa.

Mobile navigation unit 200 comprises a barometric pressure sensor 205, a navigation function 210, a wireless receiver 215 in communication with a network comprising a plurality of reference stations (such as reference stations 110 above), and a processor 220 embedded within the mobile navigation unit 200 coupled to a memory 225. Navigation function 210 may be any device capable of determining the horizontal coordinates of unit 200. For example, in one embodiment, navigation function 210 comprises a global navigation satellite system (GNSS) receiver, such as but not limited to a Global Positioning System (GPS) receiver. In other embodiments, navigation function 210 may employ other navigation technologies, such as but not limited to inertial reference units and or dead-reckoning devices. The processor 220 generates local pressure data based on pressure measurements from the barometric pressure sensor 205 and two-dimensional horizontal coordinate data from navigation data provided by the navigation function. Processor 220 further applies the two-dimensional horizontal coordinate data and the local pressure data to a coefficient vector (either b or b') resulting from a linear regression pressure data derived from the plurality reference stations to calculate an altitude coordinate and from that determine an altitude of mobile navigation unit. The coefficient vectors b and b' may be obtained in any of the manners described above or below in this specification. As mentioned above, it should be understood that the term "altitude coordinate" as used through-out this specification refers to a vertical distance from the plane defined by the two-dimensional horizontal coordinate data.

As discussed above, pressure measurements utilized to determine local pressure data and obtain the linear regression of pressure data, represented by the coefficients of b (or b'), may be based on absolute pressure data values or a double-difference approach. In one embodiment, the coefficients for b (or b') are received by the wireless receiver from the network while in other embodiments, the coefficients for b (or b') are determine by processor 220 from pressure data received by the wireless receiver from the network.

In one embodiment, processor 220 then applies the two-dimensional horizontal coordinate data and the local pressure data to the results of the linear regression utilizing an algorithm equivalent to either equations Eq. 2 or Eqs. 14 and 17. As would be appreciated by one of ordinary skill in the art upon reading this specification, for some embodiments, computer executable code for performing the above algorithms may be stored in memory device 225 for execution by processor 220. In one embodiment, processor 220 and the other components of mobile navigation unit 200 are comprised within a real-time embedded platform.

Figure 3:
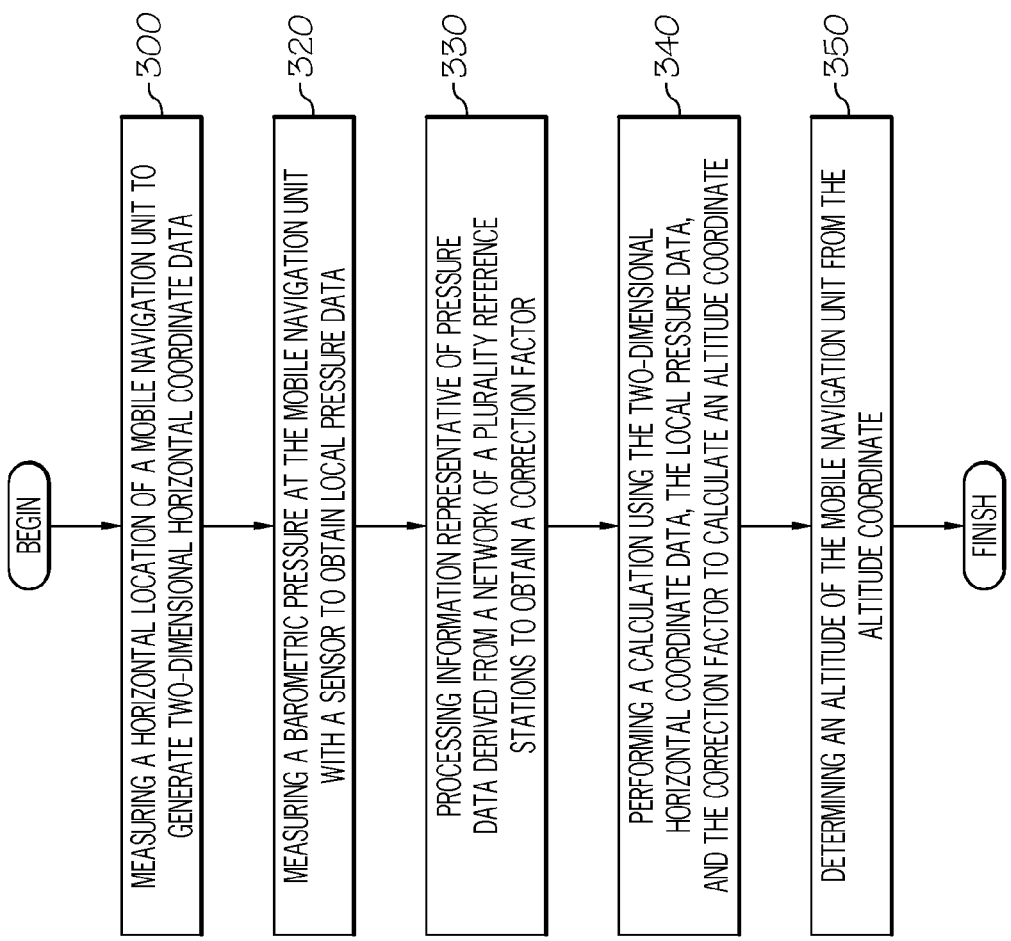
FIG. 3 is a flow chart illustrating a method of one embodiment of the present invention.

FIG. 3 is a flow chart illustrating a method performed by a mobile navigation unit of one embodiment of the present inventions, such as mobile navigation units 120 and 200 described above. As such, alternatives disclosed with respect to this method apply to the embodiments described above with respect to FIGS. 1 and 2, and vice-versa.

The method begins at 310 with measuring a horizontal location of a mobile navigation unit to generate two-dimensional horizontal coordinate data. In one embodiment, where the three-dimensional coordinates of the mobile unit are represented by the vector $$y(t) = \begin{bmatrix} y_1(t) \\ y_2(t) \\ y_3(t) \end{bmatrix},$$

the two-dimensional horizontal coordinate data is contained in $y_1(t)$ and $y_2(t)$, while $y_3(t)$ represent an altitude coordinate in the direction normal to the plane defined by $y_1(t)$ and $y_2(t)$. In one embodiment, the two-dimensional horizontal coordinate data $y_1(t)$ and $y_2(t)$ are longitude and latitude data, such as measured by a global navigation satellite systems (GNSS). In one embodiment, the two-dimensional horizontal coordinate data $y_1(t)$ and $y_2(t)$ are GPS coordinates. In other embodiments, other coordinate reference frames are used which may be either locally or globally based.

The method proceeds to 320 with measuring a barometric pressure at the mobile navigation unit with a sensor to obtain local pressure data and next to 330 with processing information representative of pressure data derived from a network of a plurality reference stations to obtain a correction factor. In one embodiment, this involves obtaining coefficients (either b or b') resulting from a linear regression of pressure data derived from a network of a plurality reference stations. In one embodiment, the coefficients may be received pre-calculated from the network of reference stations while in other embodiments, the coefficients are determine by processor directly (using any of the methods described above) from pressure data received from the network of reference stations.

The method next proceeds to 340 with performing a calculation using the two-dimensional horizontal coordinate data, the local pressure data, and the correction factor to calculate an altitude coordinate. For one embodiment, this involves performing a linear interpolation using the two-dimensional horizontal coordinate data, the local pressure data, and the coefficients to calculate an altitude coordinate.

As discussed above with respect to FIG. 1, a relationship between barometric pressure, p(y), and a position $$y(i) = \begin{bmatrix} y_1(i) \\ y_2(i) \\ y_3(i) \end{bmatrix} \in R^3,$$

can be accurately established through a linear function represented by the vector, b, using the equation:

$$p(y) = b^T \begin{bmatrix} y \\ h_1 \end{bmatrix} = \begin{bmatrix} y \\ h_1 \end{bmatrix}^T b \quad \text{(Eq. 20)}$$

where $h_1$ is a scalar constant representing a calibration bias offset as already discussed above, and where coefficients for $b = [b_1 \ldots b_4]^T \in R^4$, have already been obtained in block 330 for present environmental conditions. Thus where values for p(y), b, and the two-dimensional horizontal coordinate data $y_1(t)$ and $y_2(t)$ are known, the only remaining unknown, $y_3(t)$, is readily solved for using standard matrix mathematical techniques.

For example, where the local pressure data at the mobile navigation unit is measured as an absolute pressure, p(y), rather than a single-differenced measurement, an altitude coordinate can be calculated using a formula equivalent to:

$$y_3(t) = \frac{1}{b_3(t)} \left( p(y(t)) - [b_1(t) \ b_2(t) \ b_4(t)] \begin{bmatrix} y_1(t) \\ y_2(t) \\ h_1 \end{bmatrix} \right). \quad \text{(Eq. 21)}$$

In contrast, where the local pressure data at the mobile navigation unit is utilized to obtain a single-differenced measurement, $\Delta p(y)$, rather than an absolute measurement, an altitude coordinate can be calculated using a formula equivalent to:

$$y_3(t) = y_3(t_s) + \frac{1}{\bar{c}_T(t, t_s)} [\Delta p(y, t, t_s) - \Delta p_w(y(t), t, t_s)] \quad \text{(Eq. 22)}$$

based on the relationship $$\Delta p_w(y(t), t, t_s) = b'(t, t_s) \cdot \begin{bmatrix} y_1 \\ y_2 \\ h_1 \end{bmatrix}$$

where the coefficients for vector $b'(t,t_s) = [b_1'(t,t_s) \ b_2'(t,t_s) \ b_3'(t,t_s)]^T$ are determined based on single-differenced measurements of the pressures measured at reference stations rather than absolute pressure measurement data.

The method next proceeds to 350 with determining an altitude of the mobile navigation unit from the altitude coordinate. Where the mobile navigation unit is outdoors, the altitude coordinate $y_3(t)$, may be directly interpreted as the altitude of the mobile navigation unit. In other embodiments, the altitude coordinate determined at 340 represents a baseline altitude from which the actual altitude of the mobile navigation unit is then determined. For example, in one embodiment, the altitude coordinate determined at 330 represents an altitude, $y_3(t_0)$, determined by the mobile navigation unit at the entrance to a building. In that case, determining an altitude of the mobile navigation unit from the altitude coordinate can be determined using equations equivalent to either:

$$y_3(t) = y_3(t_0) + \frac{p(y(t)) - p_0(t) - \Delta p_{in\_out}}{c_{Tin}(t)} \text{ or,} \quad \text{(Eq. 23)}$$

$$y_3(t) = \quad \text{(Eq. 24)}$$
$$y_3(t_0) + \frac{1}{\bar{c}_T(t, t_0)} [\Delta p(y, t, t_0) - \Delta p_w(y(t_0), t, t_0) - \Delta p_{in\_out}]$$

where $t_0$ is the time just before the mobile navigation unit enters a building, and $y(t_0)$ is the calculated position vector for the mobile navigation unit at time $t_0$. For any time t, pressure data at the building entrance and c $$c_{Tin}(t) = \frac{dp}{dh}$$

can be estimated using absolute or single-differenced pressure data as described above. That is, the value $y_3(t_0)$ measured at the entrance of the building is treated as the baseline and $y_3(t)$ is subsequently determined based on changes from that baseline estimated from pressure and temperature data taken by the remote navigation unit at time, t.

In one embodiment of the method shown in FIG. 3, applying the two-dimensional horizontal coordinate data and the local pressure data to a linear regression of pressure data further comprises receiving barometric pressure data and/or location data from the plurality of reference stations and calculating the coefficients of b or b' at the mobile navigation unit. In another embodiment, the coefficients of b or b' are calculated external to the mobile navigation unit and then received by the mobile navigation unit for use in calculating the altitude coordinate at 330. For example, in one application one reference station of the network of reference stations may have the responsibility of collecting pressure data from the network, calculating the coefficients of b, and then transmitting those coefficients of b for use by one or more mobile navigation units within the region serves by the network. In other applications, a stand-alone node instead performs the collecting of pressure data, and calculating and transmitting of coefficients for b.

Several means are available to implement the systems and methods discussed in this specification. These means include, but are not limited to, digital computer systems, microprocessors, programmable controllers and field programmable gate arrays (FPGAs) or application-specific integrated circuits (ASICs). Therefore other embodiments of the present invention are program instructions resident on computer readable media which when implemented by such means enable them to implement embodiments of the present invention. Computer readable media include any form of a physical computer memory storage device. Examples of such a physical computer memory device include, but is not limited to, punch cards, magnetic disks or tapes, optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for mobile navigation, the method comprising:
    measuring a horizontal location of a mobile navigation unit to generate two-dimensional horizontal coordinate data;
    measuring a barometric pressure at the mobile navigation unit with a sensor to obtain local pressure data;
    obtaining coefficients resulting from a linear regression of pressure data derived from a network of a plurality of reference stations;
    performing a linear interpolation using the two-dimensional horizontal coordinate data, the local pressure data, and the coefficients to calculate an altitude coordinate; and
    determining an altitude of the mobile navigation unit from the altitude coordinate.

2. The method of claim 1, wherein the coefficients comprise either:
    a vector of coefficients, b, where $b=[b_1 \ldots b_4]^T \epsilon R^4$ derived from pressure data as measured by the plurality of reference stations, or
    a vector of coefficients, b', where $b'=[b'_1 \ldots b'_3]^T \epsilon R^3$ derived from pressure data as measured by the plurality of reference stations.

3. The method of claim 1, wherein three-dimensional coordinates of the mobile navigation unit are represented by the vector $$y(t) = \begin{bmatrix} y_1(t) \\ y_2(t) \\ y_3(t) \end{bmatrix},$$

the two-dimensional horizontal coordinate data is contained in $y_1(t)$ and $y_2(t)$, and $y_3(t)$ represent an altitude in a direction normal to the plane of $y_1(t)$ and $y_2(t)$.

4. The method of claim 1, wherein the local pressure data at the mobile navigation unit provides a single differenced pressure value; and
    wherein the pressure data is derived from single-differenced pressure data provided by the plurality of reference stations.

5. The method of claim 1, wherein the coefficients are based on an equation equivalent to $$p(y) = b^T \begin{bmatrix} y \\ h_1 \end{bmatrix} = \begin{bmatrix} y \\ h_1 \end{bmatrix}^T b$$

where $h_1$ is a scalar constant representing a calibration bias offset, and where coefficients for $b=[b_1 \ldots b_4]^T \epsilon R^4$, are known for present environmental conditions.

6. The method of claim 1, wherein determining an altitude of the mobile navigation unit from the altitude coordinate further comprises utilizing the altitude coordinate for a baseline altitude from which the altitude of the mobile navigation unit is then determined.

7. The method of claim 1, further comprising receiving the pressure data from the plurality of reference stations and calculating the coefficients at the mobile navigation unit.

8. A system for mobile navigation, the system comprising:
    a network including a plurality of reference stations, each of the reference stations configured to transmit pressure data derived from barometric pressure measurements;
    at least one mobile navigation unit in communication with the network, wherein the at least one mobile navigation unit is further configured to obtain coefficients resulting from a linear regression of the pressure data derived from the network of the plurality of reference stations;
    wherein the at least one mobile navigation unit is further configured to perform a linear interpolation using two-dimensional horizontal coordinate data, local pressure data, and the coefficients to calculate an altitude coordinate and determine an altitude of the at least one mobile navigation unit.

9. The system of claim 8, wherein the at least one mobile navigation unit further comprises a barometric pressure sensor to generate the local pressure data, and a navigation function for determining the two-dimensional horizontal coordinate data.

10. The system of claim 9, wherein the navigation function comprises a global navigation satellite system (GNSS) receiver.

11. The system of claim 8, wherein the local pressure data at the mobile navigation unit provides a single differenced pressure value, and
wherein the pressure data is derived from single-differenced pressure data provided by the plurality of reference stations.

12. The system of claim 8, wherein the coefficients comprise either:
a vector of coefficients, b, where $b=[b_1 \ldots b_4]^T \epsilon R^4$ derived from the pressure data measured by the plurality of reference stations, or
a vector of coefficients, b', where $b'=[b'_1 \ldots b'_3]^T \epsilon R^3$ derived from the pressure data measured by the plurality of reference stations.

13. The system of claim 12, wherein the network further comprises at least one node that receives the pressure data measured by the plurality of reference stations, calculates the vector of coefficients, b, and transmits the vector of coefficients, b, to the at least one remote navigation unit.

14. A mobile navigation unit, the mobile navigation unit comprising:
a barometric pressure sensor;
a navigation function;
a wireless receiver in communication with a network comprising a plurality of reference stations;
a processor embedded within the mobile navigation unit;
wherein the processor is configured to generate local pressure data based on pressure measurements from the barometric pressure sensor and two-dimensional horizontal coordinate data from navigation data provided by the navigation function;
wherein the processor is further configured to obtain coefficients resulting from a linear regression of the pressure data derived from the network of the plurality of reference stations;
wherein the processor is further configured to perform a linear interpolation using the two-dimensional horizontal coordinate data, the local pressure data, and the coefficients to calculate an altitude coordinate.

15. The mobile navigation unit of claim 14, wherein the linear regression of the pressure data is derived from single-differenced pressure data provided by the plurality of reference stations.

16. The mobile navigation unit of claim 14, wherein the coefficients comprise either:
a vector of coefficients, b, where $b=[b_1 \ldots b_4]^T \epsilon R^4$ derived from the pressure data measured by the plurality of reference stations, or
a vector of coefficients, b', where $b'=[b'_1 \ldots b'_3]^T \epsilon R^3$ derived from the pressure data measured by the plurality of reference stations.

17. The mobile navigation unit of claim 14, wherein the pressure data is received by the wireless receiver from the network.

18. The mobile navigation unit of claim 14, wherein the coefficients are determined by the processor from the pressure data derived from the network of the plurality of reference stations as received by the wireless receiver from the network.

* * * * *